(12) United States Patent
Zhu (10) Patent No.: US 8,085,737 B2
(45) Date of Patent: Dec. 27, 2011

(54) MULTI-TRANSCEIVER MOBILE COMMUNICATION DEVICE AND METHODS FOR NEGATIVE SCHEDULING

(75) Inventor: Jing Zhu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 844 days.

(21) Appl. No.: 12/115,722

(22) Filed: May 6, 2008

(65) Prior Publication Data

US 2009/0279511 A1 Nov. 12, 2009

(51) Int. Cl.
*H04J 3/00* (2006.01)
(52) U.S. Cl. .................. 370/336; 370/465
(58) Field of Classification Search .......... 370/328–329, 370/336, 338, 345–348, 437, 442–444, 449, 370/461–462, 389, 392, 465
See application file for complete search history.

(56) References Cited

U.S. PATENT DOCUMENTS

| | | | |
|---|---|---|---|
| 7,002,943 B2 * | 2/2006 | Bhagwat et al. | 370/338 |
| 7,545,787 B2 * | 6/2009 | Bitran et al. | 370/338 |
| 7,688,784 B2 * | 3/2010 | Bitran et al. | 370/329 |
| 7,733,835 B2 * | 6/2010 | Sammour et al. | 370/338 |
| 2004/0102220 A1 | 5/2004 | Kurita et al. | |
| 2007/0183383 A1 | 8/2007 | Bitran et al. | |
| 2007/0274272 A1 * | 11/2007 | Joshi et al. | 370/338 |
| 2008/0240048 A1 * | 10/2008 | Okker et al. | 370/338 |
| 2008/0240059 A1 * | 10/2008 | Kang | 370/338 |
| 2009/0003303 A1 | 1/2009 | Zhu et al. | |
| 2009/0109907 A1 * | 4/2009 | Tsai et al. | 370/329 |
| 2009/0245133 A1 * | 10/2009 | Gupta et al. | 370/254 |
| 2009/0257392 A1 * | 10/2009 | Hosein | 370/329 |
| 2010/0056136 A1 | 3/2010 | Jing | |
| 2010/0202416 A1 * | 8/2010 | Wilhelmsson et al. | 370/336 |

FOREIGN PATENT DOCUMENTS

| | | |
|---|---|---|
| JP | 02271845 | 9/2002 |
| JP | 02319887 | 10/2002 |
| WO | WO-2009137295 A2 | 11/2009 |

OTHER PUBLICATIONS

"International Application Serial No. PCT/US2009/041878, Search Report mailed Nov. 26, 2009".
"International Application Serial No. PCT/US2009/041878, Written Opinion mailed Nov. 26, 2009".

* cited by examiner

*Primary Examiner* — Kevin Mew
(74) *Attorney, Agent, or Firm* — Schwegman, Lundberg & Woessner, P.A.; Gregory J. Gorrie (57) ABSTRACT

A broadband wireless access network (BWAN) transceiver of a multi-transceiver mobile communication device may transmit a negative scheduling (NS) request frame that includes time-related QoS parameters to a BWAN base station to request one or more negative allocation (NA) periods. In response, the base station may transmit a NS management response frame to indicate when NA periods are to occur during subsequent BWAN frames. The BWAN base station may also transmit a subsequent NS response frame to update the configuration of the NA periods including an indication of when a subsequent NA period is to occur.

21 Claims, 5 Drawing Sheets

MULTI-TRANSCEIVER MOBILE COMMUNICATION DEVICE AND METHODS FOR NEGATIVE SCHEDULING

TECHNICAL FIELD

Some embodiments pertain to wireless communications. Some embodiments pertain to multi-transceiver mobile communication devices that include co-located transceivers, such as a broadband wireless access network (BWAN) transceiver (e.g., a Worldwide Interoperability for Microwave Access (WiMax) transceiver) and a local transceiver (e.g., a Wireless Local Area Network (WLAN) transceiver or a Bluetooth (BT) transceiver).

BACKGROUND

Many wireless communication devices today include more than one transceiver for communicating with different networks and different devices in accordance with various communication standards and techniques. One issue with these multi-transceiver devices is that the communications of one transceiver may interfere with the communications of another transceiver. For example, when a multi-transceiver mobile communication device includes a WiMax transceiver and either a BT or WLAN transceiver, transmissions by one transceiver may interfere with the receptions of the other transceiver.

Thus, there are general needs for systems and methods that help reduce conflicts between the co-located transceivers of a multi-transceiver mobile communication device.

SUMMARY

In some embodiments, a multi-transceiver mobile communication device comprises a broadband wireless access network (BWAN) transceiver, a local transceiver, and a coexistence controller. The coexistence controller is configured to determine time-related quality-of-service (QoS) parameters for negative scheduling (NS) service. The coexistence controller may also configure the BWAN transceiver to transmit a NS-request frame that includes the QoS parameters to a BWAN base station to request one or more negative allocation (NA) periods within BWAN frames. When the request for the NA periods is granted by the BWAN base station, the BWAN transceiver and the BWAN base station may refrain from communications during the NA periods. During the NA periods, the local transceiver may communicate with a local device.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments set forth in the claims encompass all available equivalents of those claims.

Figure 1:
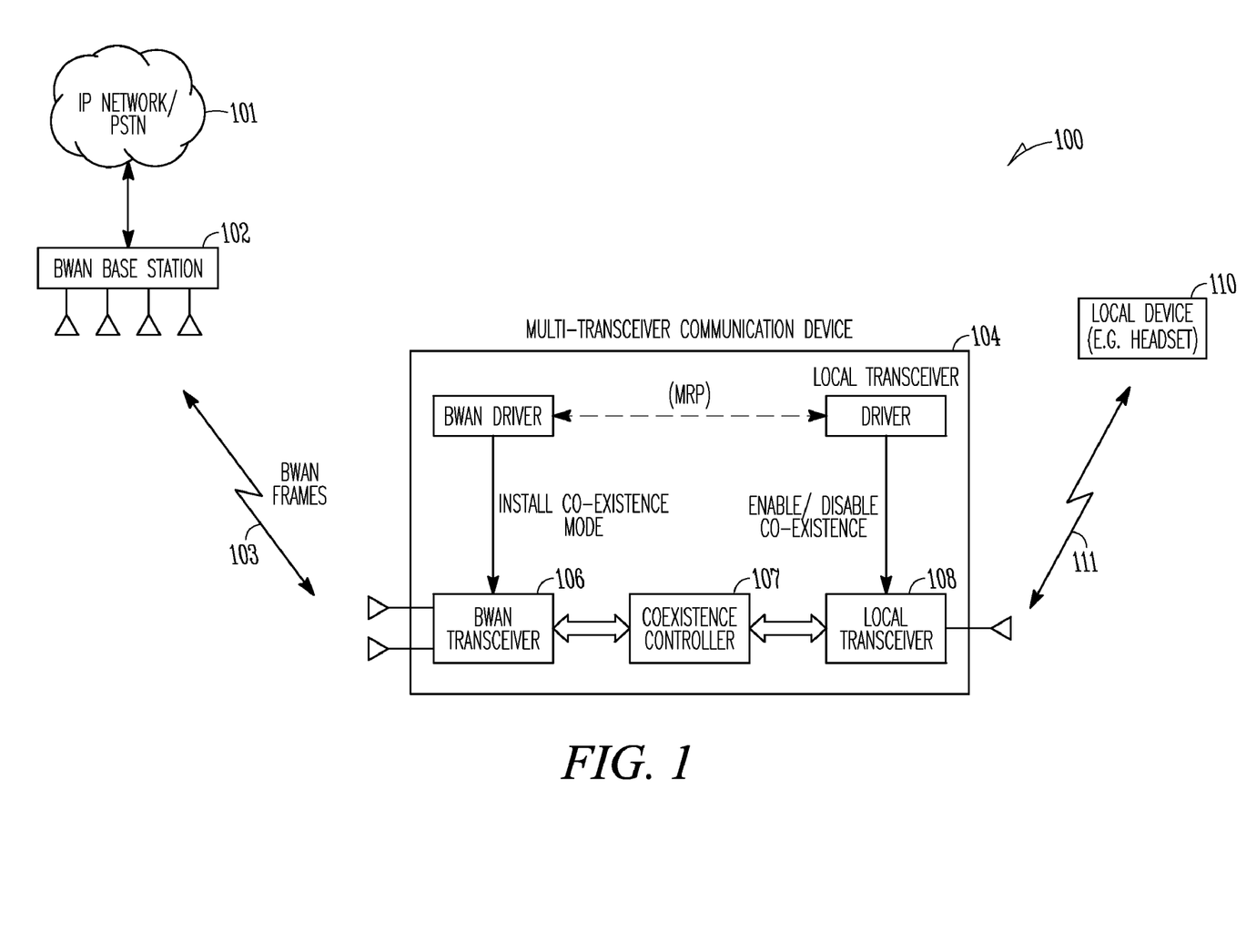
FIG. 1 illustrates an environment in which wireless communications may take place in accordance with some embodiments.

FIG. 1 illustrates an environment in which wireless communications may take place in accordance with some embodiments. Environment 100 includes BWAN base station 102, multi-transceiver mobile communication device 104 and local device 110. Multi-transceiver mobile communication device 104 includes BWAN transceiver 106 for communicating with BWAN base station 102 using BWAN frames 103. Multi-transceiver mobile communication device 104 also includes local transceiver 108 for communicating with one or more local devices, such as local device 110. In these embodiments, multi-transceiver mobile communication device 104 may be referred to as a multi-radio platform (MRP). Local transceiver 108 may, among other things, discover local device 110, establish a connection with local device 110, and communicate with local device 110, as described in more detail below. BWAN base station 102 may be coupled with one or more networks 101, such as the Internet or the PSTN to provide communications between networks 101 and multi-transceiver mobile communication device 104.

In accordance with embodiments, multi-transceiver mobile communication device 104 includes coexistence controller 107 to interface with BWAN transceiver 106 and local transceiver 108. Coexistence controller 107 may configure BWAN transceiver 106 to request one or more negative allocation (NA) periods within BWAN frames 103 from base station 102 when local transceiver 108 desires to communicate with local device 110. In these embodiments, coexistence controller 107 may determine time-related QoS parameters for a negative scheduling (NS) service, and may configure BWAN transceiver 106 to transmit a NS-request management frame that includes the QoS parameters to BWAN base station 102 to request one or more NA periods. The QoS parameters may include, for example, a maximum latency (D) and a minimum duration (T) for the requested NS service, although the scope of the embodiments is not limited in this respect.

In these embodiments, the QoS parameters may be selected to characterize a desired coexistence activity, and BWAN base station 102 may schedule an exact time for multi-transceiver mobile communication device 104, to be absent. Theses scheduled periods may be referred to as negative allocations.

When the request for the one or more NA periods is granted by BWAN base station 102, BWAN transceiver 106 and BWAN base station 102 may refrain from some or all communications during the NA periods. During the NA periods, local transceiver 108 may be configured by coexistence controller 107 to communicate with local device 110.

BWAN transmissions by BWAN transceiver 106 will not likely interfere with local communications between local transceiver 108 and local device 110 during the NA periods because BWAN transceiver 106 may be configured to refrain from transmitting. Furthermore, local communications between local transceiver 108 and local device 110 will not likely interfere with receptions by BWAN transceiver because BWAN transceiver may be configured to refrain from receiving. During the NA periods, local transceiver 108 may discover an unknown local device, may establish a connection with a known local device, may communicate over an already established connection with a local device, or may perform other communication related operations with a local device without interference from BWAN transceiver 106 and without interfering with the operations of BWAN transceiver 106.

In these embodiments, a link or connection between BWAN transceiver 106 and BWAN base station 102 may have already been established before the NA request is sent. If no link or connection between BWAN transceiver 106 and BWAN base station 102 is established, no NA request may need to be sent because there are not likely to be any coexistence problems. In some embodiments, when no link or connection between BWAN transceiver 106 and BWAN base station 102 is established, a NA request may be sent to prepare for a connection or link that may be established in the near future.

In some embodiments, BWAN transceiver 106 includes circuitry to communicate with BWAN base station 102 with BWAN frames 103 using an orthogonal frequency division multiple access (OFDMA) technique. In some embodiments, BWAN transceiver 106 may be a WiMax transceiver and BWAN base station 102 may be a WiMax base station, although the scope of the embodiments is not limited in this respect. In some embodiments, local transceiver 108 may be a shorter-range transceiver and may comprise either a Bluetooth (BT) transceiver or a WiFi transceiver although the scope of the embodiments is not limited in this respect as local transceiver 108 may be almost any other transceiver that may potentially interfere with BWAN transceiver 106.

Figure 2A:
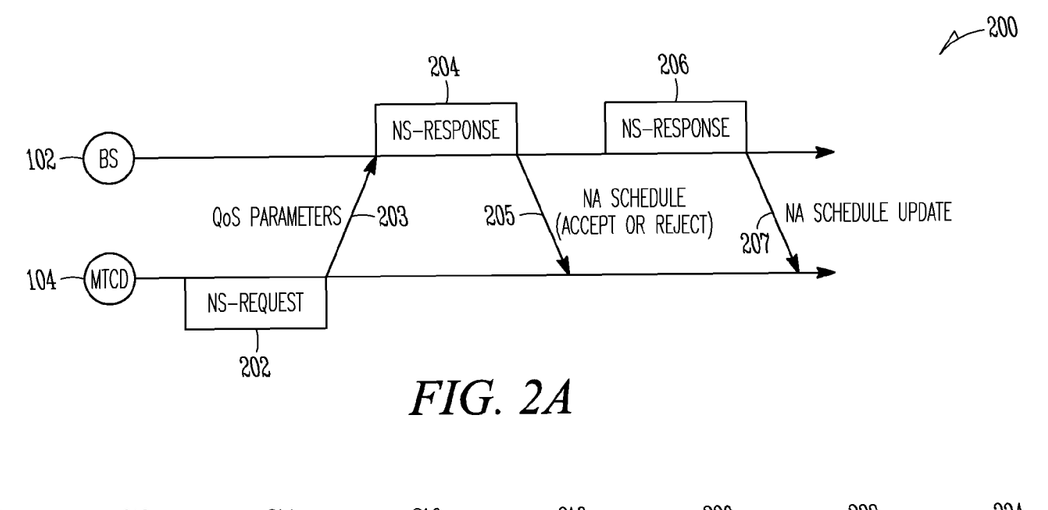
FIG. 2A illustrates the communication of negative scheduling (NS) request frames and negative scheduling response frames in accordance with some embodiments.

FIG. 2A illustrates the communication 200 of negative scheduling request frames and negative scheduling response frames in accordance with some embodiments. NS request frame 202 may be transmitted by BWAN transceiver 106 of a multi-transceiver mobile communication device (MTCD) 104 to BWAN base station 102. NS request frame 202 may include time-related QoS parameters 203. In response to receipt of NS request frame 202, BWAN base station 102 may transmit NS response frame 204 to BWAN transceiver 106. NS response frame 204 may include NA schedule 205 which indicates when NA periods are to occur during subsequent BWAN frames 103. In some embodiments, BWAN base station 102 may transmit subsequent NS response frame 206 to BWAN transceiver 106. Subsequent NS response frame 206 may include NA schedule update 207 which may indicate when a subsequent NA period is to occur. In this way, NA periods may be dynamically allocated. These embodiments are discussed in more detail below.

Figure 2B:
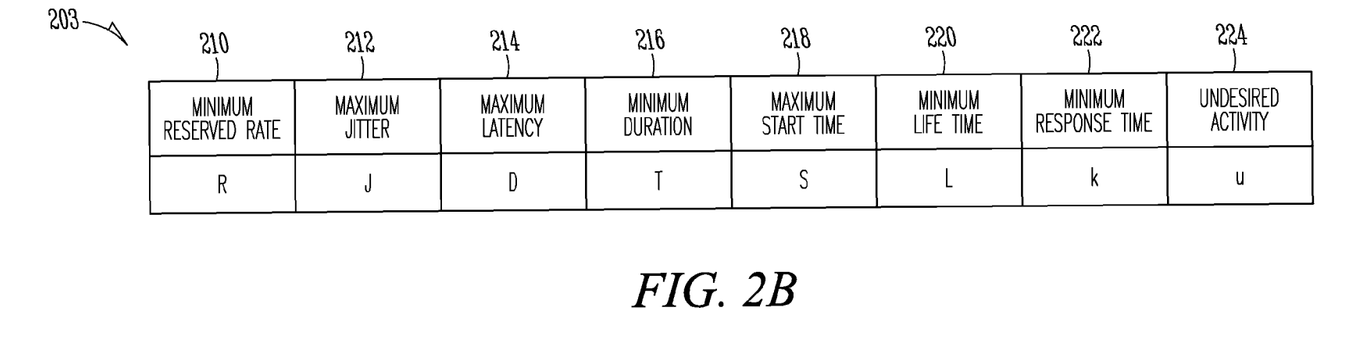
FIG. 2B illustrates examples of some quality-of-service (QoS) parameters that may be included in a negative scheduling request frame in accordance with some embodiments.

FIG. 2B illustrates examples of some quality-of-service (QoS) parameters that may be included in a negative scheduling request frame in accordance with some embodiments. One or more of time-related QoS parameters 203 may be included within NS-request frame 202 (FIG. 2A). Time-related QoS parameters 203 may include, minimum reserve rate (R) 210, maximum jitter (J) 212, maximum latency (D) (214), minimum duration (T) (216), maximum start time (S) 218, minimum lifetime (L) 220, minimum response time (k) 222, and undesired activity parameter (u) 224.

In these embodiments, minimum reserve rate (R) 210 may refer to the minimum negative allocation ratio in time, maximum jitter (J) 212 may refer to the maximum difference between the successive intervals of negative allocations, maximum start time (S) 218 may refer to the latest time that a first negative allocation starts, minimum lifetime (L) 220 may refer to the minimum duration between the start time of the first negative allocation period and the end time of the last negative period, and minimum response time (k) 222 may refer to the minimum duration between the time that BWAN transceiver 106 receives a NS response frame and the starting time of the first negative allocation associated with the NS response frame.

Undesired activity parameter 224 may indicate an undesired activity that is being requested during the NA periods. The undesired activity may comprise: a) no BWAN receptions or transmissions by BWAN transceiver 106 which may be indicated by a '0', b) no BWAN transmissions by BWAN transceiver 106 which may be indicated by a '1', or c) no BWAN receptions by BWAN transceiver 106 which may be indicated by a '2' as undesired activity parameter 224.

Figure 2C:
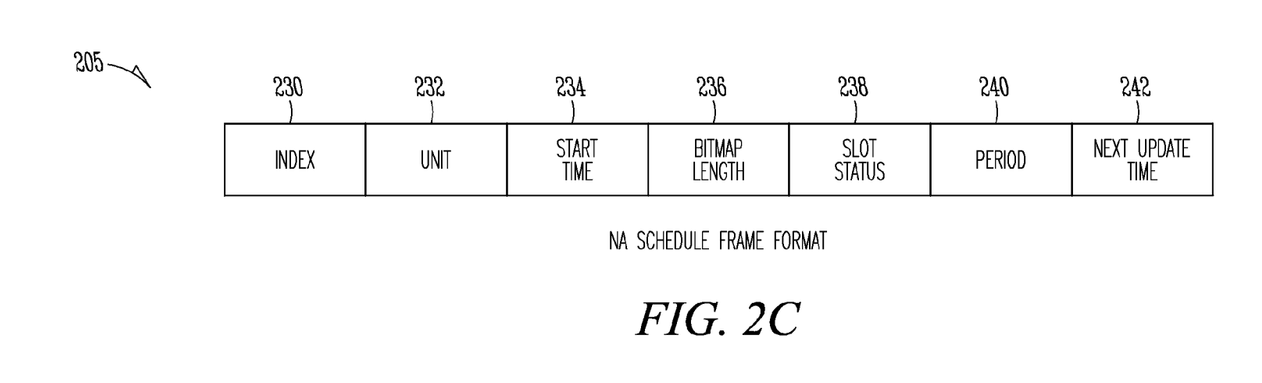
FIG. 2C illustrates examples of some information that may be included in a negative response frame in accordance with some embodiments.

FIG. 2C illustrates examples of some information that may be included in a negative response frame in accordance with some embodiments. NA schedule 205 may be received from BWAN base station 102 (FIG. 1) in NA response frame 204 (FIG. 2A). NA schedule 205 may include start time field 234 of the NA periods and slot status field 238 indicating whether or not time slots of BWAN frames 103 (FIG. 1) are part of the NA period. NA schedule 205 may also include one or more fields, such as index field 230 to identify the particular bitmap schedule, unit field 232 to indicate the units of the bitmap slot in a number of BWAN frames, bitmap length field 236 to indicate a length of slot status field 238 that comprises the NA schedule 205 in a number of bytes, period field 240 to indicate an interval between two consecutive periods in the unit of BWAN frames, and next update time field 242 to indicate a latest time of when the next update of NA schedule 205 is to occur. Next update time field 242 may indicate the time in units of $2^P$ BWAN frames, in which the exponent 'P' is the value of the field which indicates the next update time of $2^P$ frames. In some embodiments, NA schedule 205 may be in a bitmap format. These embodiments are discussed in more detail below.

Figure 3:
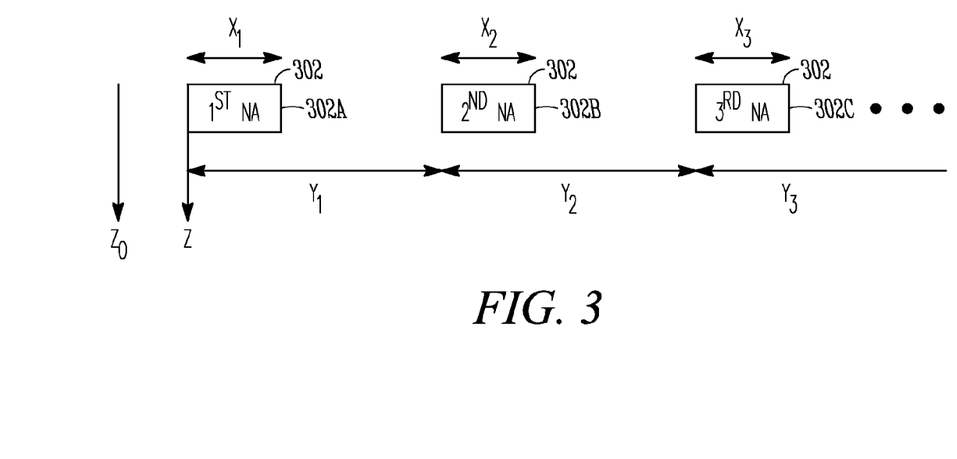
FIG. 3 illustrates dynamic negative scheduling including negative allocation (NA) periods in accordance with some embodiments.

FIG. 3 illustrates dynamic negative scheduling including negative allocation periods in accordance with some embodiments. NA periods 302 may be provided by BWAN base station 102 (FIG. 1) within BWAN frames 103 (FIG. 1). The parameters of NA periods 302 may be indicated within response frame 204 (FIG. 2A) and/or subsequent response frame 206 (FIG. 2A). In some embodiments, an initial NA schedule, such as NA schedule 205 (FIGS. 2A and 2C), may be received which may be the NA schedule for first NA period 302A. An NA schedule update, such as NA schedule update 207 (FIG. 2A), may subsequently be received which may be the NA schedule for second NA period 302B. Another NA schedule update may also be received which may be the NA schedule for third NA period 302C. As illustrated in FIG. 3, $x_i$ illustrates the duration of the associated NA period, $y_i$ illustrates the interval between successive NA periods, z indicates start time 234 of NA period 302A, and $z_0$ indicates the time that NS response frame 204 was received at BWAN transceiver 106. In some embodiments, the parameters may be constrained in accordance with the following equations:

$$x_i \geq T, y_i \leq D, z \leq S, z - z0 \geq k$$

$$\sum_{y_i} \leq L, |y_i - y_{i+1}| \leq J, \text{ and } \frac{\sum x_i}{\sum y_i} \geq R$$

In some situations, an NA schedule may provide more NA periods that what is needed. In this situation, BWAN base station 102 may claim some NA periods back when additional resources are needed for positive allocations (PAs), such as retransmissions. This action by BWAN base station 102 may maintain the QoS agreement accepted by BWAN base station 102 when the request for NS services was accepted.

Figure 4:
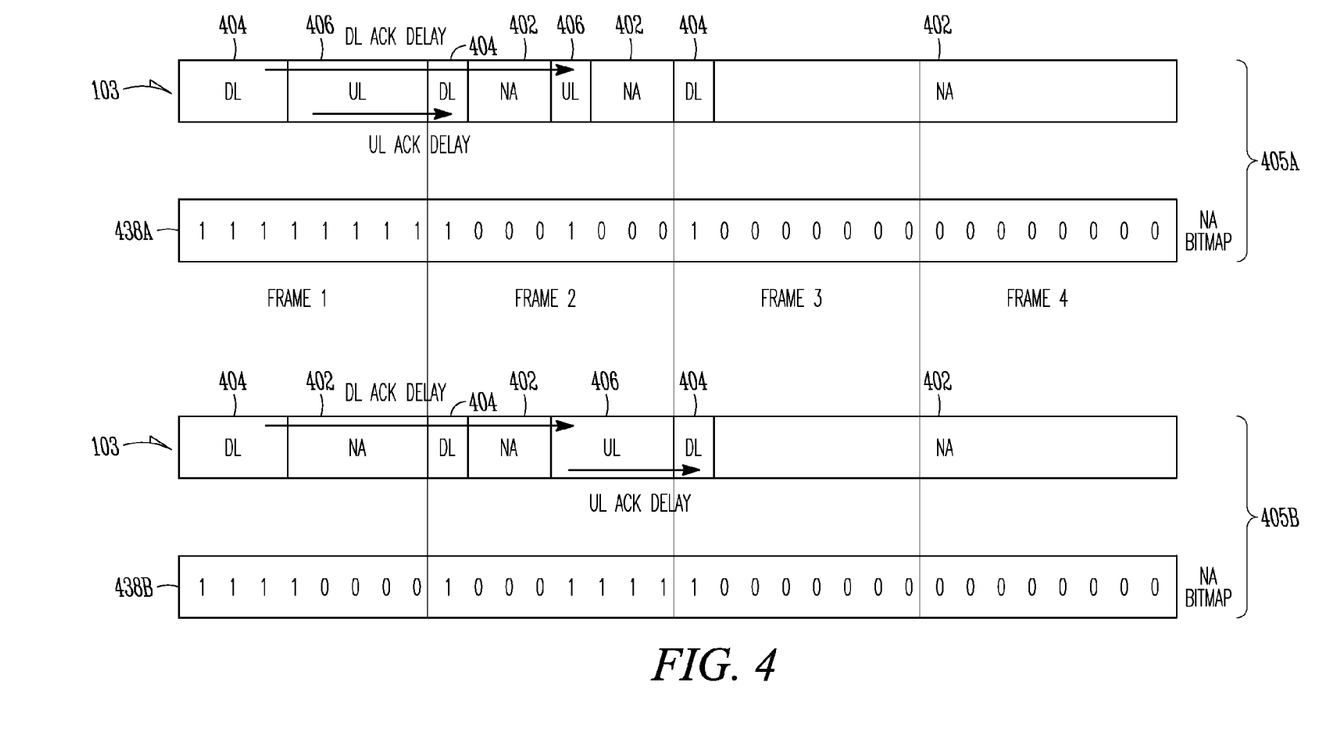
FIG. 4 illustrates negative allocation periods within downlink and uplink subframes and associated negative allocation bitmaps in accordance with some embodiments.

FIG. 4 illustrates negative allocation periods within downlink and uplink subframes and associated negative allocation bitmaps in accordance with some embodiments. As illustrated in FIG. 4, NA periods 402 may be provided in one or more downlink (DL) subframes 404 or one or more uplink (UL) subframes 406 of BWAN frames 103. NA periods 402 may correspond to NA periods 302 (FIG. 3).

In these embodiments, the request for one or more NA periods 402 may be granted by BWAN base station 102 (FIG. 1) with an explicit schedule, may be granted by BWAN base station 102 without an explicit schedule, or may not be granted by BWAN base station 102. When request for one or more NA periods 402 is granted by BWAN base station 102 with an explicit schedule, BWAN transceiver 106 may receive NA schedule 205 from BWAN base station 102 within NS response frame 204 which indicates when NA periods 402 are to occur during subsequent BWAN frames 103. NA schedule 205 (FIG. 2C) may include at least start time field 234 of NA periods 402 and slot status field 238 indicating whether or not time slots of BWAN frames 103 are part of NA period 402.

In some embodiments, slot status field 238 may comprise an NA bitmap, such as NA bitmap 438A or NA bitmap 438B. The NA bitmap may include either a '1' or a '0' for each slot of BWAN frames 103 indicating whether or not a slot is within one of NA periods 402. In these embodiments, a '0' may indicate that the slot is within NA period 402, and a '1' indicate the slot is not within NA period 402. When a slot is not within an NA period, it may be part of a PA.

When the request for one or more NA periods is granted by BWAN base station 102 without an explicit schedule, BWAN transceiver 106 may be configured to identify NA periods on a frame-by-frame basis for each of a plurality of subsequent BWAN frames 103 from either downlink or uplink maps of the downlink subframes 404. Each downlink subframe 404 may include a downlink map and an uplink map indicating which portions of the downlink and uplink subframes may apply to BWAN transceiver 106. In these embodiments, when the NS request is granted without an explicit schedule, BWAN transceiver 106 may be informed of the acceptance in a response frame.

When the request for one or more NA periods is not granted (i.e., not accepted) by BWAN base station 102, coexistence controller 107 may be configured to cause local transceiver 108 to communicate with local device 110 when BWAN transceiver 106 is not active so that BWAN communications do not interfere with local communications, and/or so that local communications do not interfere with BWAN communications. In these embodiments, when the NS request is not granted, BWAN transceiver 106 may be informed of this in a response frame. In these embodiments, coexistence controller 107 may provide a BWAN active signal to local transceiver 108 to indicate when BWAN transceiver 106 is actively transmitting and/or actively receiving. When the request for one or more NA periods 302 is not granted by BWAN base station 102, other methods may be used to prevent interference.

NA schedules 405A and 405B are two examples of NA schedules that may be provided by BWAN base station 102 in which the DL-to-UL subframe ratio size is set to 1:1. In some embodiments, BWAN base station 102 may send out an update to switch between NA schedule 405A and NA schedule 405B, since both NA schedules 405A & 405B meet the QoS requirements of the requested NS service.

In the illustrated examples, the granularity is 6 symbols (i.e., 6 symbols per slot), and one BWAN frame may be 5 ms long and may comprise 48 symbols. In these example embodiments, 4 bytes may be used to describe a NA bitmap schedule with a period of 4 frames (20 ms). In FIG. 4, portions of the DL and UL subframes that are not part of NAs 402 may include PAs. The NA ratio is 65.6% and 68.8% for the NA schedules associated with bitmap 438A and 438B respectively.

Although most of the time in BWAN frames 3 and 4 is illustrated as being reserved for NA periods 402, BWAN base station 102 may still use this time for a PA if needed (e.g., for retransmissions) provided that the requested QoS parameters have been met. The first 6 symbols of frame 3 may be reserved for a PA and may be indicated by a '1' in NA bitmaps 438A and 438B. This may allow BWAN base station 102 to indicate whether there are any more PAs for BWAN transceiver 106 in frames 3 and 4. If the same allocation pattern in frames 1 and 2 were to be used for frames 3 and 4, the NA ratios would be reduced to 37.5% and 43.8%, respectively. The variable 'P' may be used to denote the probability that BWAN base station 102 will use more resources in frames 3 and 4 for PAs. For the schedule of bitmap 438A, 37.5%×P+65.6% (1−P)≧50%, therefore P≦55.5%. For the schedule of bitmap 438B, 43.8%×P+68.8% (1−P)≧50%, therefore P≦75.2%. In this example, 50% corresponds to minimum reserved rate 210 (R) (i.e., one of QoS parameters 203 in the NS request). Thus, the maximum probability that base station 102 can include a PA into frames 3 and 4 is 75.2%, which are primarily reserved for a NA, while still meeting the "minimum reserved rate" of 50% that was requested by BWAN transceiver 106.

Figure 5:
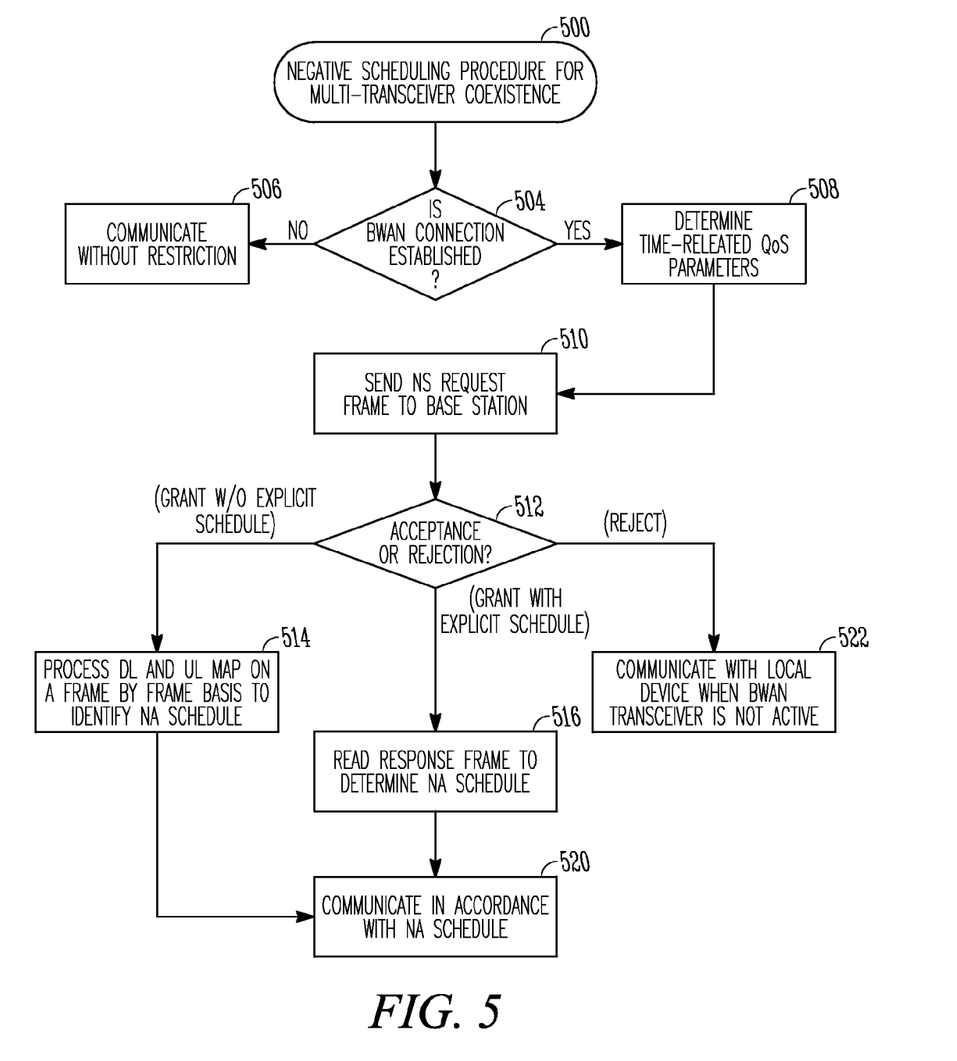
FIG. 5 is a flow chart of a negative scheduling procedure in accordance with some embodiments.

FIG. 5 is a flow chart of a negative scheduling procedure in accordance with some embodiments. Negative scheduling procedure 500 may be performed by coexistence controller 107 (FIG. 1), although some operations may be performed by BWAN transceiver 106 (FIG. 1) and local transceiver 108 (FIG. 1). Procedure 500 may be performed when communications by local transceiver 108 and local device 110 are desired by multi-transceiver mobile communication device 104.

In operation 504, coexistence controller 107 may determine whether or not a BWAN connection between BWAN transceiver 106 and BWAN base station 102 is established. When a connection is not established, operation 506 is performed. When a connection is established, operation 508 is performed. In some embodiments, when no BWAN connection is established, operation 508 may be performed in anticipation that a BWAN connection is going to be established.

In operation 506, local transceiver 108 (FIG. 1) and local device 110 (FIG. 1) may communicate without restriction because their communications will not interfere with an unestablished BWAN connection, nor will an unestablished BWAN connection interfere with their communications.

In operation 508, coexistence controller 107 may determine time-related QoS parameters related to a desired NS service. Examples of some time-related QoS parameters are illustrated in FIG. 2B.

In operation 510, a NS request frame, such as NS request frame 204 (FIG. 2A), may be sent by BWAN transceiver 106 to BWAN base station 102. The NS request frame may include the time-related QoS parameters.

In operation 512, the request for NS service may be either accepted or rejected by the base station and may be indicated in a NS response frame, such as NS response frame 204. The request may be accepted with an explicit NA schedule, or without an explicit schedule. When the request is accepted without an explicit NA schedule, operation 514 is performed. When the request is accepted with an explicit NA schedule, operation 516 is performed. When the request is not accepted, operation 522 is performed.

Operation 514 comprises processing DL and UL maps in DL subframes transmitted by BWAN base station 102 on a frame-by-frame basis to identify the NA schedule for that frame.

Operation 516 comprises reading the NA schedule received from the base station in a NS response frame to determine the NA schedule. The NA schedule may indicate one or more NA periods, such as NA periods 404, for one or more subsequent frames.

Operation 520 comprises communicating in accordance with the NA schedule. In these embodiments, embodiments, local transceiver 108 and local device may communicate during the scheduled NA periods, as determined on a frame-by frame basis in operation 514, or as determined in operation 516. In these embodiments, BWAN transceiver 106 and BWAN base station 102 may refrain from certain communications during the scheduled NA periods, depending on the undesired activity requested by undesired activity parameter (u) 224 (FIG. 2B).

In operation 522, local transceiver 108 may communicate with local device 110 at times selected to reduce interference with BWAN communications or at times selected so that BWAN communications will not interfere with communications between local transceiver 108 and local device 110. In some embodiments, local transceiver 108 may communicate with local device 110 when BWAN transceiver is not active. In some embodiments, the BWAN active signal, discussed above, may be asserted by coexistence controller 107 during receipt of a downlink subframe, and when local transceiver 108 is a Bluetooth (BT) transceiver, local transceiver 108 may align a slot boundary of either master-to-slave or slave-to-master slot based on timing information conveyed by the BWAN active signal. The BWAN active signal may be de-asserted by coexistence controller 107 during transmission of an uplink subframe by BWAN transceiver 106.

Although the individual operations of procedure 500 are illustrated and described as separate operations, one or more of the individual operations may be performed concurrently, and nothing requires that the operations be performed in the order illustrated.

The term Bluetooth, as used herein may refer to a short-range digital communication protocol including a short-haul wireless protocol frequency-hopping spread-spectrum (FHSS) communication technique operating in the 2.4 GHz spectrum. The term BWAN may refer to devices that communicate using any broadband wireless access communication technique, such as an orthogonal frequency division multiple access (OFDMA), that may potentially interfere with the spectrum utilized by BT or WiFi communications, including interference due to out-of-band (OOB) emissions. The use of the terms WiFi, Bluetooth and WiMax are not intended to restrict the embodiments to any of the requirements of the standards and specifications relevant to WiFi, Bluetooth, and WiMax.

In some embodiments, BWAN transceiver 106 and BWAN base station 102 may communicate using orthogonal frequency division multiplexed (OFDM) communication signals over a multicarrier communication channel in accordance with OFDMA. The OFDM signals may comprise a plurality of orthogonal subcarriers. In some of these multicarrier embodiments, BWAN transceiver 106 and BWAN base station 102 may communicate in accordance with specific communication standards, such as the Institute of Electrical and Electronics Engineers (IEEE) standards including the IEEE 802.16-2004 and the IEEE 802.16(e) standards for wireless metropolitan area networks (WMANs) including variations and evolutions thereof (e.g., IEEE 802.16(m)), although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some embodiments, multi-transceiver mobile communication device 104 may be considered a mobile station or a mobile terminal. In some embodiments, local transceiver 108 may be a short-range frequency-hopping (SRFH) transceiver that communicates in accordance with the BT standards of IEEE 802.15.1. In other embodiments, local transceiver 108 may be an ultra-wideband (UWB) transceiver that communicates in accordance with IEEE 802.15.3a, a frequency-hopping spread spectrum (FHSS) WLAN transceiver that communicates in accordance with IEEE 802.11-2007 § 14, a direct-sequence spread spectrum (DSSS) WLAN transceiver that communicates in accordance with IEEE 802.11-2007 § 15 (formerly 802.11(b)), an OFDM WLAN transceiver that communicates in accordance with IEEE 802.11-2007 § 17 (formerly IEEE 802.11(a), or an high-rate (HR) DSSS OFDM transceiver configured to communicate using DSSS and OFDM that communicates in accordance with IEEE 802.11-2007 § 18 and 19 (formerly IEEE 802.11(g)). When local transceiver 108 is a BT transceiver, local device 110 may comprise a BT device, such as a BT headset. In some embodiments, when local transceiver 108 is a WLAN access point, local device 110 may be any WLAN device.

In some embodiments, WiMax transceiver 106 and WiMax base station 102 may use one or more antennas for communications. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, two or more antennas may be effectively separated to take advantage of spatial diversity and the different channel characteristics that may result.

Although multi-transceiver mobile communication device 104 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of multi-transceiver mobile communication device 104 may refer to one or more processes operating on one or more processing elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-transceiver mobile communication device comprising:
    a broadband wireless access network (BWAN) transceiver;
    a local transceiver; and
    a coexistence controller to determine time-related quality-of-service (QoS) parameters for negative scheduling (NS) service, and to configure the BWAN transceiver to transmit a NS-request frame that includes the QoS parameters to a BWAN base station to request one or more negative allocation (NA) periods within BWAN frames,
    wherein when the request for the NA periods is granted by the BWAN base station, the BWAN transceiver and the BWAN base station refrain from communications during the NA periods, and
    wherein during the NA periods, the local transceiver is configured to communicate with a local device.

2. The device of claim 1 wherein the time-related QoS parameters included within the NS-request frame include a maximum latency (D), a minimum duration (T), and an undesired activity parameter (u) for the NS service.

3. The device of claim 2 wherein the undesired activity parameter indicates an undesired activity that is being requested during the NA periods, the undesired activity comprising one of:
    a) no BWAN receptions or transmissions,
    b) no BWAN transmissions, or
    c) no BWAN receptions.

4. The device of claim 2 wherein the time-related QoS parameters further include one or more of: a minimum reserve rate (R); a maximum jitter (J); a maximum start time (S); a minimum lifetime (L); and a minimum response time (k).

5. The device of claim 1 wherein when the request for one or more NA periods is granted by the BWAN base station with an explicit schedule, the NA periods are provided within one or more downlink subframes or one or more subframes of the BWAN frames that are communicated between the BWAN transceiver and the BWAN base station.

6. The communication device of claim 5 wherein when the request for one or more NA periods is granted by the BWAN base station with an explicit schedule, the BWAN transceiver receives a NA schedule from the BWAN base station within a NS response frame which indicates when NA periods are to occur during subsequent BWAN frames.

7. The communication device of claim 6 wherein the NA schedule includes at least a start time of the NA periods and a slot status indicating whether or not time slots of the BWAN frames are part of the NA period.

8. The communication device of claim 7 wherein a NA schedule update is received by the BWAN transceiver from the BWAN base station in a subsequent NS response frame, the NA schedule update indicating at least when a subsequent NA period is to occur.

9. The communication device of claim 7 wherein the slot status comprises a NA bitmap that includes either a '1' or a '0' for each slot of the BWAN frames indicating whether or not a slot is within one of the NA periods.

10. The communication device of claim 7 wherein the NA schedule is in a bitmap format and further includes one or more of: an index field; a unit field; a bitmap length field to indicate a length of the slot status field; a period field indicating an interval between two consecutive periods; and a next update time field to indicate a latest time of when a next update of the NA schedule is to occur.

11. The communication device of claim 5 wherein when the request for one or more NA periods is granted by the BWAN base station without an explicit schedule, the BWAN transceiver is configured to identify NA periods on a frame-by-frame basis for each subsequent BWAN frame from either downlink or uplink maps of the downlink subframes.

12. The communication device of claim 5 wherein when the request for one or more NA periods is not granted by the BWAN base station, the coexistence controller is configured to cause the local transceiver to communicate with a local device when the BWAN transceiver is not active.

13. The communication device of claim 1 wherein the BWAN transceiver includes circuitry to communicate with the BWAN base station with the BWAN frames using an orthogonal frequency division multiple access (OFDMA) technique, and
    wherein the local transceiver is a shorter-range transceiver and comprises either a Bluetooth (BT) transceiver or a WiFi transceiver.

14. A method performed by a broadband wireless access network (BWAN) base station for providing negative allocation (NA) periods within BWAN frames, the method comprising:

transmitting a negative scheduling (NS) response frame to indicate when NA periods are to occur during a plurality of subsequent BWAN frames; and transmitting a subsequent NS response frame to update a configuration of the NA periods including to indicate at least when a subsequent NA period is to occur, wherein during the NA periods, a BWAN transceiver of a multi-transceiver mobile communication device and the BWAN base station are configured to refrain from communications, and wherein during the NA periods, a local transceiver of the multi-transceiver mobile communication device is configured to communicate with a local device.

15. The method of claim 14, wherein transmitting the NS response frame and transmitting the subsequent NS response frame are performed by BWAN base station, wherein the method further comprises receiving a NS-request frame that includes time-related quality-of-service (QoS) parameters requesting the NA periods within BWAN frames, the time-related QoS parameters for the NS service being determined by a coexistence controller of the multi-transceiver mobile communication device that includes the BWAN transceiver and the local transceiver, and wherein the time-related QoS parameters included within the NS-request frame include a maximum latency (D), a minimum duration (T), and an undesired activity parameter (u) for the NS service.

16. The method of claim 15 further comprising granting the request for the NA periods by the BWAN base station, wherein the BWAN transceiver and the BWAN base station are configured to refrain from communications during the NA periods, wherein the local transceiver is configured to communicate with a local device during the NA periods.

17. The method of claim 15 wherein when the request for one or more NA periods is granted by the BWAN base station with an explicit schedule, the method comprises providing NA periods within one or more downlink subframes or one or more subframes of the BWAN frames, wherein when the request for one or more NA periods is granted by the BWAN base station without an explicit schedule, the BWAN transceiver is configured to identify NA periods on a frame-by-frame basis for each subsequent BWAN frame from either downlink or uplink maps of the downlink subframes, and wherein when the request for one or more NA periods is not granted by the BWAN base station, the coexistence controller is configured to cause the local transceiver to communicate with a local device when the BWAN transceiver is not active.

18. The method of claim 15 wherein the NA schedule includes at least a start time of the NA periods and a slot status indicating whether or not time slots of the BWAN frames are part of the NA period, and wherein the method further comprises providing a NA schedule update by the BWAN transceiver in a subsequent NS response frame, the NA schedule update indicating at least when a subsequent NA period is to occur.

19. A method performed by a multi-transceiver mobile communication device for receiving negative allocation (NA) periods to enable coexistence between a broadband wireless access network (BWAN) transceiver and a local transceiver of the mobile station, the method comprising:

determining time-related quality-of-service (QoS) parameters for negative scheduling (NS) service, the QoS parameters including at least a maximum latency (D) and a minimum duration (T) for the NS service;

configuring the BWAN transceiver to transmit a NS-request frame that includes the QoS parameters to a BWAN base station to request one or more negative allocation (NA) periods within BWAN frames; and when one or more NA periods are granted, configuring the local transceiver to communicate with a local device during the one or more NA periods.

20. The method of claim 19 wherein the determining and the configuring are performed by a coexistence controller of the multi-transceiver mobile communication device when the request for the NA periods is granted by the BWAN base station, the method further comprises:

refraining from communications during the NA periods by the BWAN transceiver and the BWAN base station; and communicating during the NA periods by the local transceiver with the local device.

21. The method of claim 19 wherein the NA schedule includes at least a start time of the NA periods and a slot status indicating whether or not time slots of the BWAN frames are part of the NA period, and wherein the method further includes receiving a NA schedule update by the BWAN transceiver from the BWAN base station in a subsequent NS response frame, the NA schedule update indicating at least when a subsequent NA period is to occur.

* * * * *